United States Patent
Qing Song et al.

(10) Patent No.: US 12,529,395 B2
(45) Date of Patent: Jan. 20, 2026

(54) MULTI-MATERIAL BOSS AND METHOD OF MAKING THE SAME

(71) Applicant: COOLER MASTER CO., LTD., New Taipei (TW)

(72) Inventors: Zhang Qing Song, New Taipei (TW); Zhu Zhong Long, New Taipei (TW); Tu Po-Wen, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 365 days.

(21) Appl. No.: 18/300,186

(22) Filed: Apr. 13, 2023

(65) Prior Publication Data

US 2023/0258219 A1    Aug. 17, 2023

Related U.S. Application Data

(62) Division of application No. 17/064,541, filed on Oct. 6, 2020, now Pat. No. 11,655,844.

(51) Int. Cl.
| | |
|---|---|
| *F16B 37/06* | (2006.01) |
| *B23K 1/00* | (2006.01) |
| *F16B 33/02* | (2006.01) |
| *B23K 103/20* | (2006.01) |

(52) U.S. Cl.
CPC .............. *F16B 33/02* (2013.01); *F16B 37/06* (2013.01); *B23K 1/0008* (2013.01); *B23K 2103/20* (2018.08)

(58) Field of Classification Search
CPC ......... F16B 37/061; F16B 11/00; B21D 53/24
See application file for complete search history.

(56) References Cited

U.S. PATENT DOCUMENTS

| | | | |
|---|---|---|---|
| 1,829,677 A | 10/1931 | Frederick | |
| 2,374,733 A | 5/1945 | Crawford | |
| 2,426,653 A * | 9/1947 | Whelan | F16B 37/048 |
| | | | 228/56.3 |
| 2,528,040 A * | 10/1950 | Crouch | B23K 1/20 |
| | | | 285/288.11 |
| 2,623,974 A | 12/1952 | Prucha | |
| 2,817,345 A | 12/1957 | Woodruff, Sr. | |
| 4,858,686 A | 8/1989 | Calleson | |
| 5,168,142 A | 12/1992 | Gartner | |
| 5,364,012 A | 11/1994 | Davis | |
| 7,527,463 B2 | 5/2009 | Wang | |
| 8,047,740 B2 | 11/2011 | Christ | |
| 9,989,182 B2 | 6/2018 | Lowe | |

(Continued)

*Primary Examiner* — Kyle A Cook
(74) *Attorney, Agent, or Firm* — Dickinson Wright PLLC (57) ABSTRACT

A multi-material boss, configured for fastening of a fastener thereto, being a feature of a die cast part, comprising a boss cylinder, an augmenting cylinder, and a filler metal layer is provided. The boss cylinder is made of the same material as the die cast part having a first hardness, and has a first interior. The augmenting cylinder is made of an augmenting material having a second hardness, is fixedly secured in the first interior of the boss cylinder, and has a second interior defined by a second cylindrical shaped wall, a base rim, and a second opening. The second hardness is greater than the first hardness. The fastener is fastened to the multi-material boss via the second opening of the augmenting cylinder having the higher liquidus temperature and greater hardness.

8 Claims, 11 Drawing Sheets

(56) References Cited

U.S. PATENT DOCUMENTS

| | | | |
|---|---|---|---|
| 2003/0062343 A1 | 4/2003 | Ananthanarayanan | |
| 2003/0099524 A1* | 5/2003 | Chen | F16B 37/048 |
| | | | 411/429 |
| 2005/0062285 A1 | 3/2005 | Hobson | |
| 2008/0025789 A1* | 1/2008 | Lin | F16B 37/04 |
| | | | 403/361 |
| 2010/0003104 A1* | 1/2010 | Wang | F16B 37/061 |
| | | | 411/103 |
| 2010/0226731 A1* | 9/2010 | Hsieh | H05K 3/341 |
| | | | 411/171 |
| 2010/0290860 A1* | 11/2010 | Wang | F16B 5/0208 |
| | | | 411/105 |
| 2012/0269599 A1 | 10/2012 | Malek | |
| 2014/0057731 A1* | 2/2014 | Stephens | H05K 3/341 |
| | | | 470/25 |
| 2016/0138638 A1* | 5/2016 | Lukic | F16B 33/02 |
| | | | 411/428 |
| 2020/0215632 A1* | 7/2020 | Wang | F16B 19/02 |
| 2020/0276663 A1* | 9/2020 | Wang | B23K 3/087 |
| 2023/0091592 A1* | 3/2023 | Miura | B23K 11/0046 |
| | | | 411/171 |

* cited by examiner

MULTI-MATERIAL BOSS AND METHOD OF MAKING THE SAME

RELATED APPLICATIONS

The divisional Patent Application is based on U.S. patent application Ser. No. 17/064,541, filed Oct. 6, 2020, which claims the benefit of priority under 35 U.S.C. 119(a) to Chinese Patent Application No. 202021416654.X, filed on Jul. 17, 2020, the entire contents of which is hereby incorporated by reference in its entirety.

TECHNICAL FIELD

Exemplary embodiments described herein relate generally to the field of mechanical fasteners and, more particularly, to multi-material bosses and methods of making the same.

BACKGROUND

Thin-walled metal enclosures, such as those used for electric and electronic appliances and equipment housings, having bosses on an interior thereof, are often manufactured in high volumes by die casting. Die casting is a manufacturing process that produces non-ferrous metal or alloy parts via reusable molds or dies. Typically, the die casting process involves the use of a furnace, metal, die casting machine, and die, whereby the die casting machine injects molten metal, such as aluminum or zinc, at high pressure and velocity, into the die, producing geometrically complex parts, both economically and effectively. There are two main types of die casting machines, hot chamber machines, for low melting temperature metals such as zinc, and cold chamber machines, for high melting temperature metals, such as aluminum. Notwithstanding, generally, comparable metal or alloy die cast parts are not as dense and not as strong as forged parts being manufactured by the application of thermal and mechanical energy to billets and ingots, whereby materials of the billets and ingots deform, resulting in metallurgical recrystalisation and grain refinement. The difference is compounded when consideration is given to bosses and the formation thereof.

Bosses generally aid in the assembly of enclosures, acting as mounting points of the enclosures or other components. Screw bosses provide a channel for a screw for assembly. Despite screws being a reliable and inexpensive method of mechanical fastening, mounting point fastening failure often occurs due to wear-and-tear caused by multiple assembly, disassembly, and reassembly procedures. Generally, fastening failure and/or decreased fastening effectiveness results, due to chipping or cracking caused by tensile stresses that can be induced under high pressure or cross threading, among other factors.

One technique developed for decreasing and/or mitigating fastening failure and decreased fastening effectiveness is to replace bosses with a more durable and harder material threaded inserts or bushings. However, such inserts and bushings are associated with increased costs due to the pre-threaded parts and additional costs for adhesives required for securing the threaded insert or bushing in place so it doesn't back out.

SUMMARY

Accordingly, there is a need for a solution to the above mentioned problems that will provide various advantages. Such solutions are described herein. In one exemplary embodiment, a multi-material boss, configured for fastening of a fastener thereto, being a feature of a die cast part, is provided. The multi-material boss comprises a boss cylinder, an augmenting cylinder, and a filler metal layer. The boss cylinder is preferably made of the same material as the die cast part having a first liquidus temperature and a first hardness, and has a first interior defined by a first cylindrical shaped wall, and a first base. The augmenting cylinder is made of an augmenting material having a second liquidus temperature and a second hardness, is fixedly secured in the first interior of the boss cylinder, and has a second interior defined by a second cylindrical shaped wall, a base rim, and a second opening. The second liquidus temperature is higher than the first liquidus temperature and the second hardness is greater than the first hardness. The filler metal layer is made of a material having a third liquidus temperature lower than that of the first and second liquidus temperatures, at least partially compressed between the base rim of the augmenting cylinder and first base of the interior of the boss cylinder. The fastener is fastened to the multi-material boss via the second opening of the augmenting cylinder having the higher liquidus temperature and greater hardness.

In some embodiments, the feature of the die cast part comprises a protruding feature extending from a surface thereof. In some embodiments, the die cast part further comprises at least a strengthening member, configured for providing strength and stability to the protruding feature of the multi-material boss. In some embodiments, the strengthening member comprises a spacer between the protruding feature of the multi-material boss and a surface of the die cast part. In some embodiments, the shape of the spacer comprises at least one of straight lines, curves, or any combination of the foregoing.

In some embodiments, the features of the die cast part comprise at least one of a protruding feature encompassing the multi-material boss, extending from an outer perimeter wall surface of the die cast part, a protruding feature encompassing the multi-material boss, extending from an inner perimeter wall surface or corner to a base of the die cast part, or any combination of the foregoing.

In some embodiments, the multi-material boss further comprises a conical depression, configured for recessing a head of a fastener.

In some embodiments, the die cast part is made of an aluminum alloy material and the augmenting cylinder is made of at least one of a stainless steel, iron, aluminum silicon alloy, copper, copper alloy, aluminum magnesium alloy material, having a second hardness greater than the first hardness of the boss cylinder.

In some embodiments, the die cast part is made of at least one of an aluminum alloy, zinc alloy, magnesium, zinc-aluminum alloy, copper, tin or lead material, or any combination of the foregoing.

In some embodiments, the second cylindrical shaped wall comprises threads, configured for fastening by a screw fastener.

In another exemplary embodiment, a method of forming a multi-material boss, configured for fastening of a fastener thereto, being a feature of a die cast part, is provided. The method generally comprises the steps of providing a boss cylinder and providing an augmenting cylinder, and bonding the augmenting cylinder within the boss cylinder. The method preferably comprises providing a boss cylinder, made of a same material as the die cast part having a first liquidus temperature and a first hardness. Next, the method comprises determining whether the boss cylinder comprises a first interior defined by a first cylindrical shaped wall, a first base and a receivable opening. If not, drilling a first interior of the boss cylinder at a central axis thereof, defining a first cylindrical shaped wall, a first base, and a receivable opening. If yes, the method comprises providing an augmenting cylinder, made of an augmenting material having a second liquidus temperature and a second hardness, wherein the second liquidus temperature is higher than the first liquidus temperature and the second hardness is greater than the first hardness, having a mufti-functional interior defined by a working cylindrical shaped wall, a working base rim, and a multi-functional opening. Next, the method comprises providing a filler metal, made of a material having a third liquidus temperature lower than that of the first and second liquidus temperatures, in the first interior of the boss cylinder via the receivable opening. The method further comprises press-inserting the augmenting cylinder into the boss cylinder via the receivable opening. Next, the method comprises bonding the augmenting cylinder to the boss cylinder via brazing, at least spreading and adhering the filler metal between the working base rim of the augmenting cylinder and first base of the first interior of the boss cylinder forming a filler metal layer, whereby expanding air and gasses are vented through the multi-functional interior of the augmenting cylinder. The method continues with cooling the augmenting cylinder and boss cylinder. Next, the method comprises drilling the multi-functional interior of the augmenting cylinder at the multi-functional opening, forming an intermediary interior, defining an intermediary cylindrical shaped wall, a base rim, and an intermediary opening. The method comprises tapping the intermediary interior of the augmenting cylinder at the intermediary opening, forming a second interior, defining a second cylindrical shaped wall, a base rim, and a second opening. The method comprises countersinking the second interior of the augmenting cylinder at the second opening, enlarging a top portion of the second opening forming a conical depression, configured for recessing a head of a fastener, whereby the fastener is fastened to the multi-material boss via the second opening of the augmenting cylinder having the higher liquidus temperature and greater mechanical properties hardness.

In some embodiments of the method, the feature of the die cast part comprises a protruding feature extending from a surface thereof. In some embodiments of the method, the die cast part further comprises at least a strengthening member, configured for providing strength and stability to the protruding feature of the multi-material boss. In some embodiments of the method, the strengthening member comprises a spacer between the protruding feature of the multi-material boss and surface of the die cast part. In some embodiments of the method, the shape of the spacer comprises at least one of straight lines, curves, or any combination of the foregoing.

In some embodiments of the method, the features of the die cast part comprises at least one of a protruding feature encompassing the multi-material boss, extending from an outer perimeter wall surface of the die cast part, a protruding feature encompassing the multi-material boss, extending from an inner perimeter wall surface or corner to a base of the die cast part, or any combination of the foregoing.

In some embodiments of the method, the die cast part is made of an aluminum alloy material and the augmenting cylinder is made of at least one of a stainless steel, iron, aluminum silicon alloy, copper, copper alloy, aluminum magnesium alloy material, having a second mechanical properties hardness greater than the first hardness of the boss cylinder.

In some embodiments of the method, the die cast part is made of at least one of an aluminum alloy, zinc alloy, magnesium, zinc-aluminum alloy, copper, tin or lead material, or any combination of the foregoing.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts, features or steps throughout the several views, several examples of heat exchanger systems incorporating aspects of the presently disclosed principles are illustrated by way of example, and not by way of limitation.

DETAILED DESCRIPTION

As used herein, the term "liquidus temperature" is the temperature above which, a material is liquid, and below which, the material begins to freeze. The term "hardness" refers to the mechanical property of hardness, the measure of a material's resistance to localized plastic deformation induced by mechanical indentation of abrasion.

The following describes various principles related to fastening systems by way of reference to specific examples of die cast parts and features thereof, including specific arrangements and examples of multi-material bosses, and fasteners embodying innovative concepts. More particularly, but not exclusively, such innovative principles are described in relation to selected examples of multi-material bosses and fasteners, and well-known functions or constructions are not described in detail for purposes of succinctness and clarity. Nonetheless, one or more of the disclosed principles can be incorporated in various other embodiments of multi-material bosses, and fasteners to achieve any of a variety of desired outcomes, characteristics, and/or performance criteria.

Thus, multi-material bosses, and fasteners having attributes that are different from those specific examples discussed herein can embody one or more of the innovative principles, and can be used in applications not described herein in detail. Accordingly, embodiments of multi-material bosses, and fasteners not described herein in detail also fall within the scope of this disclosure, as will be appreciated by those of ordinary skill in the relevant art following a review of this disclosure.

Exemplary embodiments as disclosed herein are directed to bosses aiding in the assembly of enclosures, acting as mounting points of the enclosures or other components. Bosses may be configured within an electric or electronics appliance or equipment system that includes thin-walled enclosures. Some other illustrative examples include enclosures used in the machinery, vehicle, appliance, toy, sporting goods, office equipment, and heat sink industries.

In one embodiment, a multi-material boss, configured for fastening of a fastener thereto, being a feature of a die cast part, comprising a boss cylinder, an augmenting cylinder, and a filler metal layer is provided. The boss cylinder is made of the same material as the die cast part having a first hardness, and has a first interior. The augmenting cylinder is made of an augmenting material having a second hardness, is fixedly secured in the first interior of the boss cylinder, and has a second interior defined by a second cylindrical shaped wall, a base rim, and a second opening. The second hardness is greater than the first hardness. The fastener is fastened to the multi-material boss via the second opening of the augmenting cylinder having the higher liquid us temperature and greater hardness.

Figure 1A:
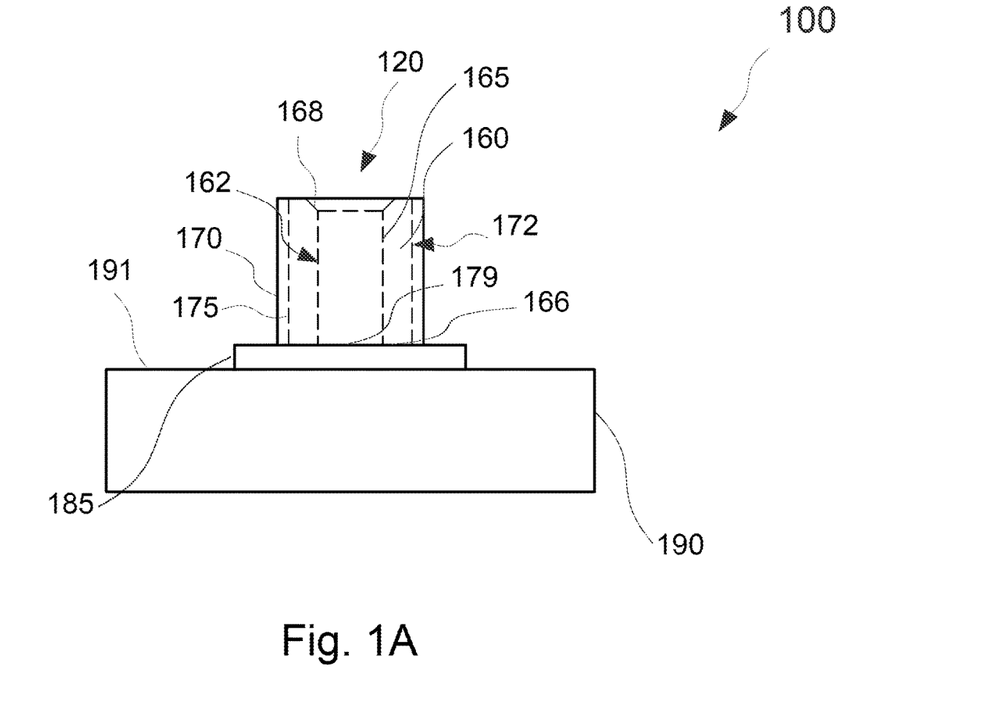
FIG. 1A is a schematic interior view of a multi-material boss, according to an exemplary embodiment.
Figure 1B:
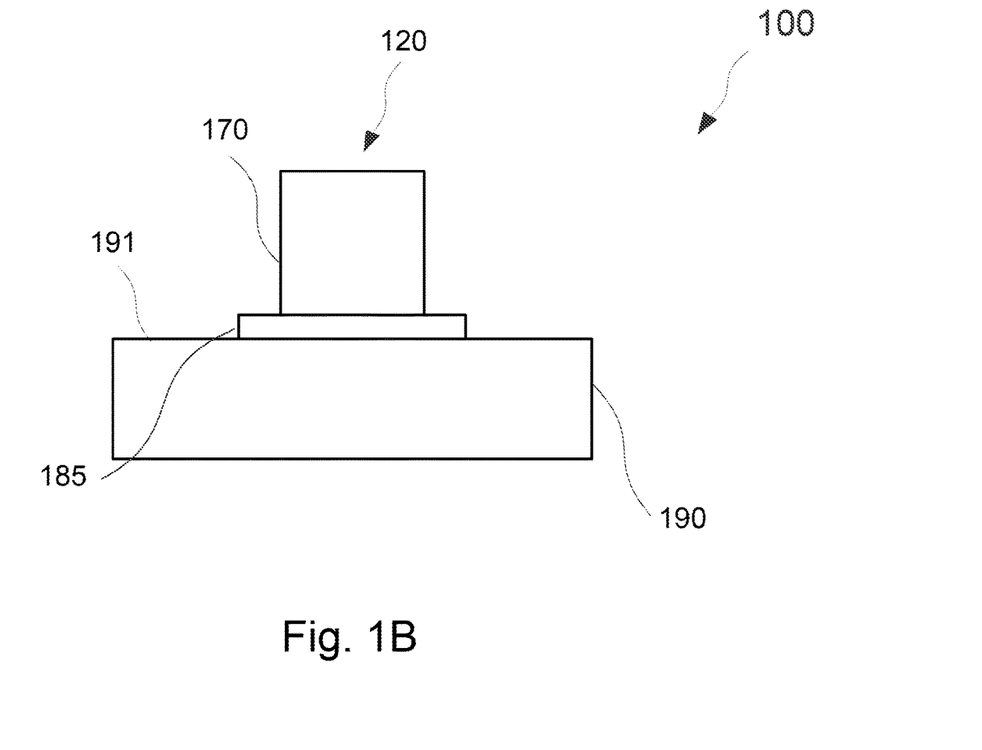
FIG. 1B is a schematic view of the multi-material boss of FIG. 1A, according to an exemplary embodiment.
Figure 1C:
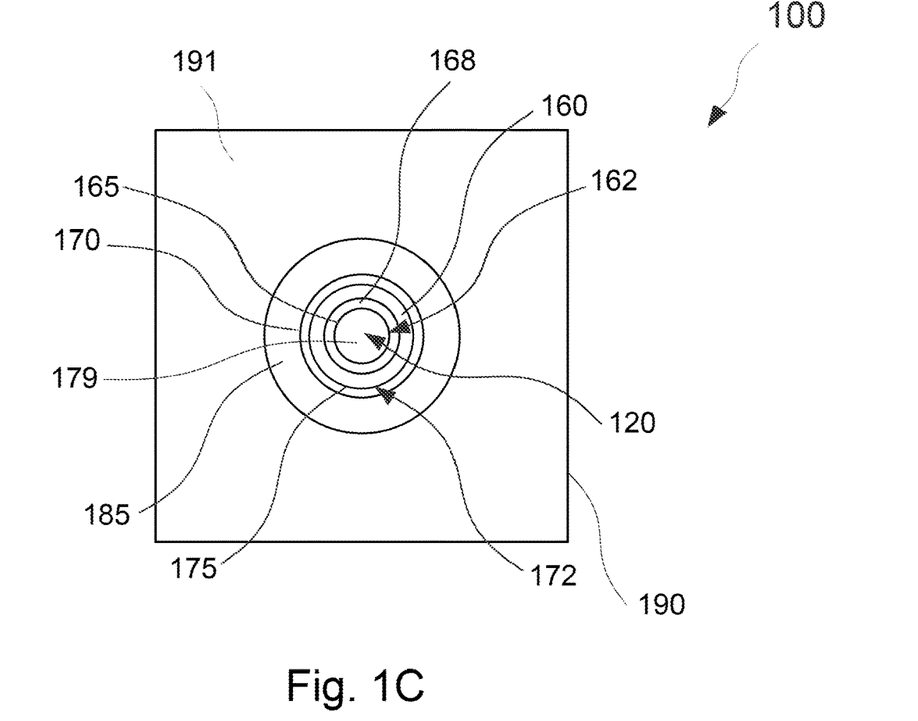
FIG. 1C is a schematic top view of the multi-material boss of FIG. 1A, according to an exemplary embodiment.
Figure 1D:
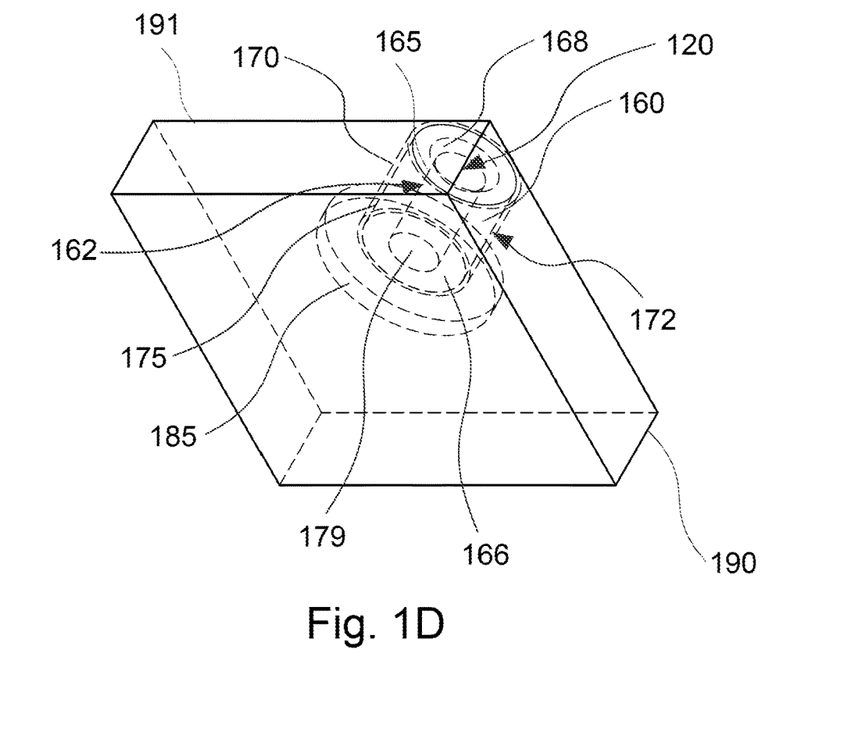
FIG. 1D is a schematic perspective interior view of the multi-material boss of FIG. 1A, according to an exemplary embodiment.
Figure 2A:
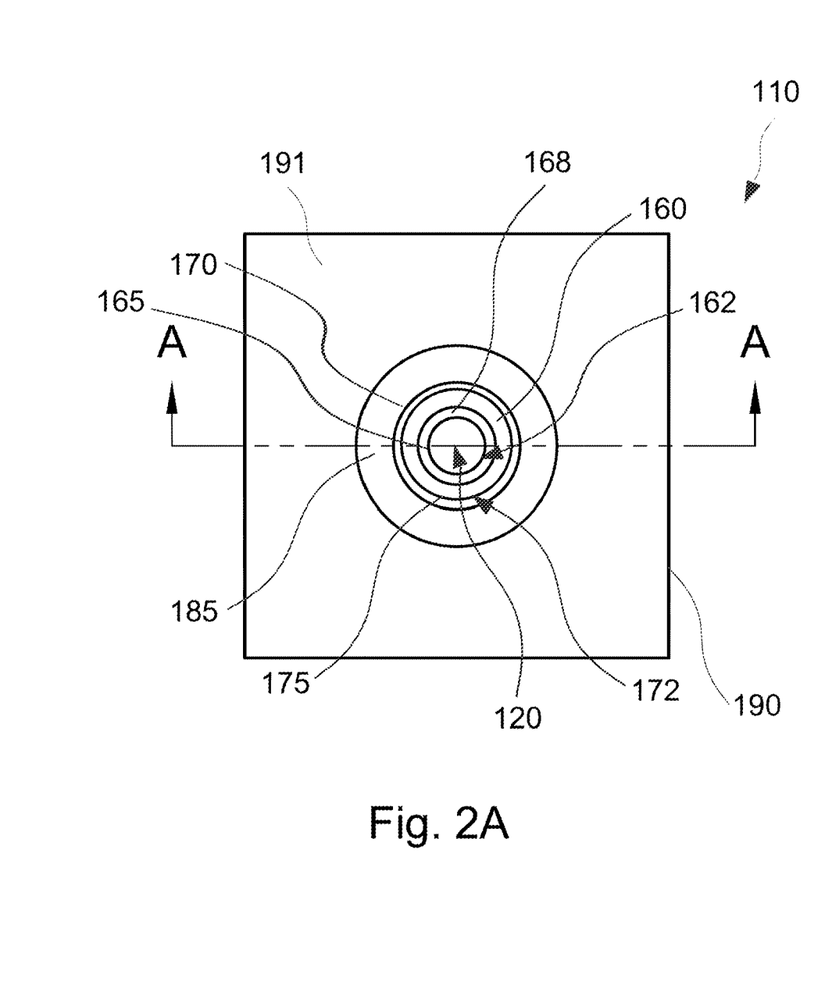
FIG. 2A is a schematic top view of the multi-material boss of FIG. 1A with line A-A, according to an exemplary embodiment.
Figure 2B:
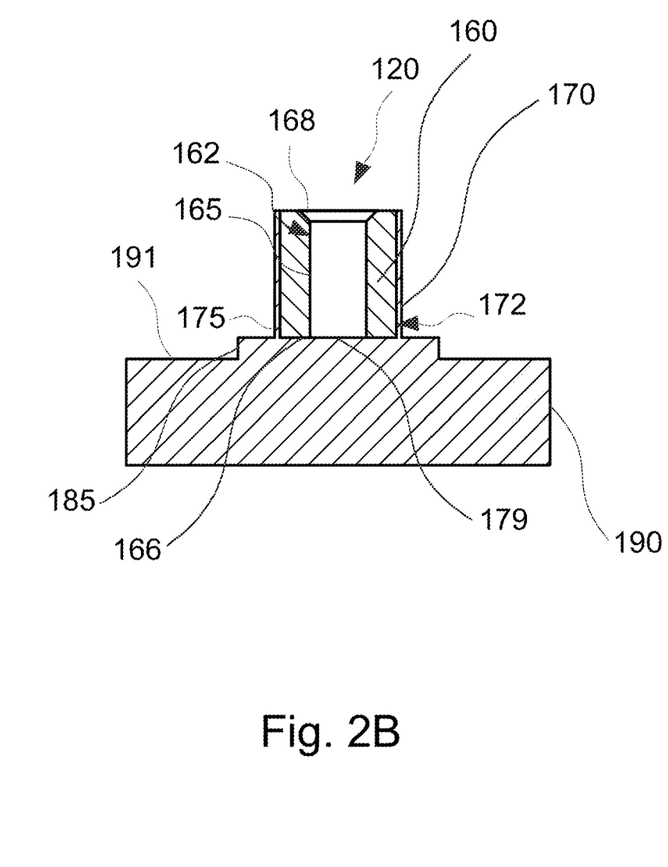
FIG. 2B is a schematic cross-sectional view of the multi-material boss of FIG. 1A along line A-A of FIG. 2A, according to an exemplary embodiment.
Figure 2C:
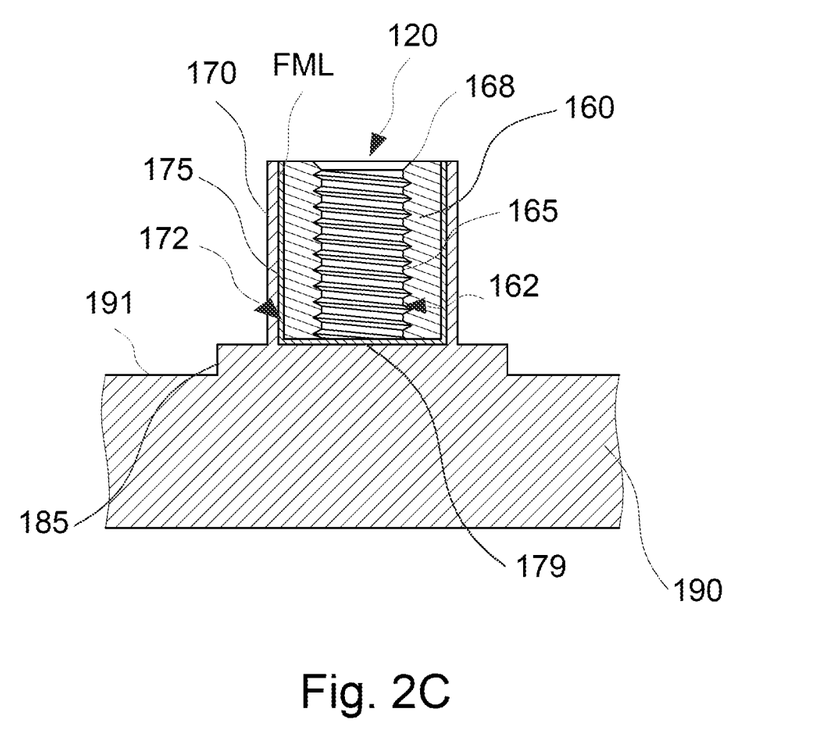
FIG. 2C is a schematic detailed cross-sectional view of the multi-material boss of FIG. 1A along line A-A of FIG. 2A, according to an exemplary embodiment.

FIG. 1A is a schematic interior view of a multi-material boss, according to an exemplary embodiment. FIG. 1B is a schematic view of the multi-material boss of FIG. 1A, according to an exemplary embodiment. FIG. 1C is a schematic top view of the multi-material boss of FIG. 1A, according to an exemplary embodiment. FIG. 1D is a schematic perspective interior view of the multi-material boss of FIG. 1A, according to an exemplary embodiment. FIG. 2A is a schematic top view of the multi-material boss of FIG. 1A with line A-A, according to an exemplary embodiment. FIG. 2B is a schematic cross-sectional view of the multi-material boss of FIG. 1A along line A-A of FIG. 2A, according to an exemplary embodiment. FIG. 2C is a schematic detailed cross-sectional view of the multi-material boss of FIG. 1A along line A-A of FIG. 2A, according to an exemplary embodiment. Referring to FIGS. 1A to 2C, in one embodiment, a multi-material boss 100, configured for fastening of a fastener (not shown) thereto, being a feature of a die cast part 190, is provided. The multi-material boss 100 comprises a boss cylinder 170, an augmenting cylinder 160, and a filler metal layer (FML) (see FIG. 2C). The boss cylinder 170 is made of the same material as the die cast part 190, and has a first liquidus temperature and a first hardness, having a first interior 172 defined by a first cylindrical shaped wall 175, and a first base 179. The augmenting cylinder 160, fixedly secured in the first interior 172 of the boss cylinder 170, preferably aligning flush therewith, is made of an augmenting material having a second liquidus temperature and a second hardness, and has a second interior 162 defined by a second cylindrical shaped wall 165, a base rim 166, and a second opening 120. The second liquidus temperature is higher than the first liquidus temperature and the second hardness is greater than the first hardness. The filler metal layer (FML) is made of a material having a third liquidus temperature lower than that of the first and second liquidus temperatures, at least partially compressed between the base rim 166 of the augmenting cylinder 160 and first base 179 of the interior of the boss cylinder 170. The fastener is fastened to the multi-material boss 100 via the second opening 120 of the augmenting cylinder 160 having the higher liquidus temperature and greater hardness.

In some embodiments, the second cylindrical shaped wall 165 comprises threads (See FIG. 2C), configured for fastening by a screw fastener. In some embodiments, the number of multi-material bosses 100 is two or greater.

In some embodiments, the feature of the die cast part 190 comprises a protruding feature extending from a surface 191 thereof. In some embodiments, the die cast part 190 further comprises at least a strengthening member 185, configured for providing strength and stability to the protruding feature of the multi-material boss 100. In some embodiments, the strengthening member 185 comprises a spacer between the protruding feature of the multi-material boss 100 and surface 191 of the die cast part 190. In some embodiments, the shape of the spacer comprises at least one of straight lines, curves, or any combination of the foregoing. In some embodiments, the shape of the spacer is quadrilateral.

In some embodiments, the feature of the die cast part comprises at least one of a protruding feature encompassing the multi-material boss 100, extending from an outer perimeter wall surface of the die cast part, a protruding feature encompassing the multi-material boss 100, extending from an inner perimeter wall surface or corner to a base of the die cast part, or any combination of the foregoing.

In the various embodiments, the strengthening member 185 comprises a spacer between the protruding feature of the multi-material boss 100 and surface 191 of the die cast part 190; however, the embodiments are not limited thereto. Those having ordinary skill in the relevant art may readily appreciate that the feature of the die cast part 190 may also comprise at least one of a gusset extending from an outer sidewall of the multi-material boss to a base of the die cast, part, a rib extending from an outer sidewall of the multi-material boss to a wall of the die cast part, or any combination of the foregoing.

In some embodiments, the multi-material boss 100 further comprises a conical depression 168, configured for recessing a head of a fastener.

In some embodiments, the die cast part 190 is made of an aluminum alloy material and the augmenting cylinder 160 is made of at least one of a stainless steel, iron, aluminum silicon alloy, copper, copper alloy, aluminum magnesium alloy material, having a second hardness greater than the first hardness of the boss cylinder 170.

In the various embodiments, the die cast part 190 is made of an aluminum alloy material; however, the embodiments are not limited thereto. Those having ordinary skill in the relevant art may readily appreciate that the die cast part 190 may also be made of alternative materials suitably known in the art. As an example, in some embodiments, the die cast part 190 is made of at least one of a zinc alloy, magnesium, zinc-aluminum alloy, copper, tin or lead material, or any combination of the foregoing.

In the various embodiments, the augmenting cylinder 160 is made of at least one of a stainless steel, iron, aluminum silicon alloy, copper, copper alloy, and aluminum magnesium alloy material; however, the embodiments are not limited thereto. Those having ordinary skill in the relevant art may readily appreciate that the augmenting cylinder 160 may be made of at least one of a stainless steel, iron, aluminum silicon alloy, copper, copper alloy, aluminum magnesium alloy material. As long as the second hardness of the augmenting cylinder 160 is greater than the first hardness of the boss cylinder 170.

Figure 3:
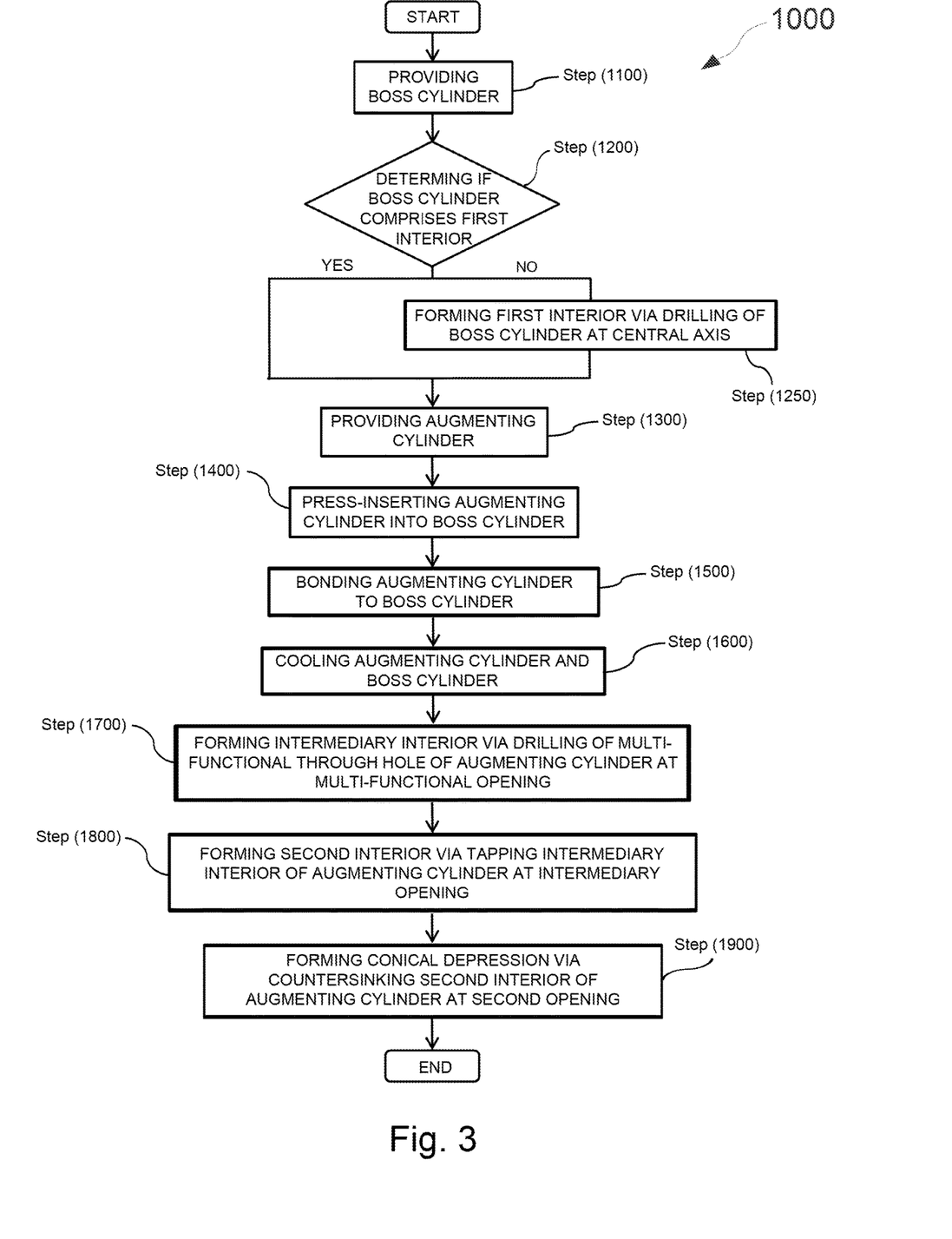
FIG. 3 is a flow chart illustrating a manufacturing method of the multi-material boss of FIG. 1A, according to an exemplary embodiment.
Figure 4:
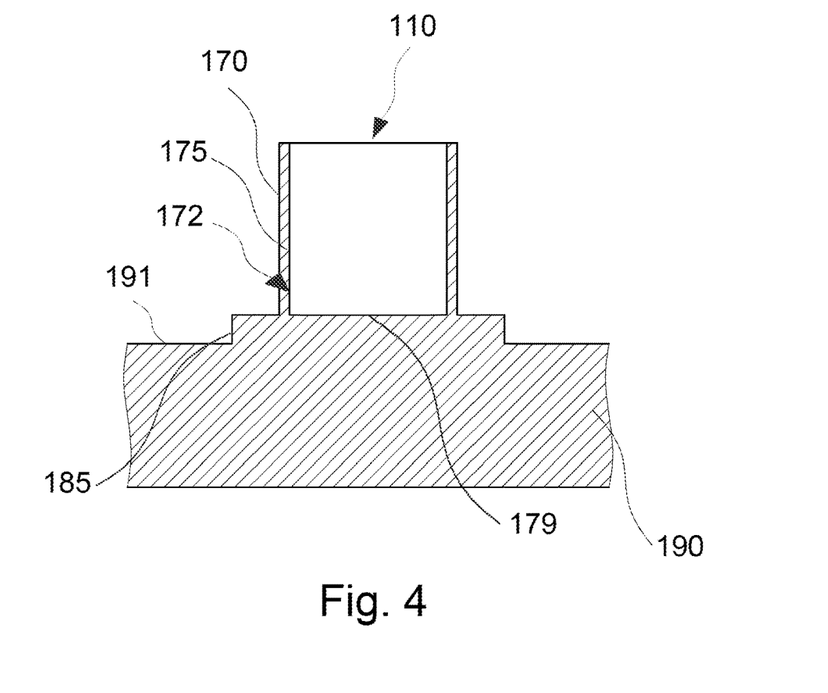
FIG. 4 is a schematic detailed cross-sectional view of the multi-material boss of FIG. 1A, following Step (1100) of the manufacturing method of FIG. 3, according to an exemplary embodiment.
Figure 5:
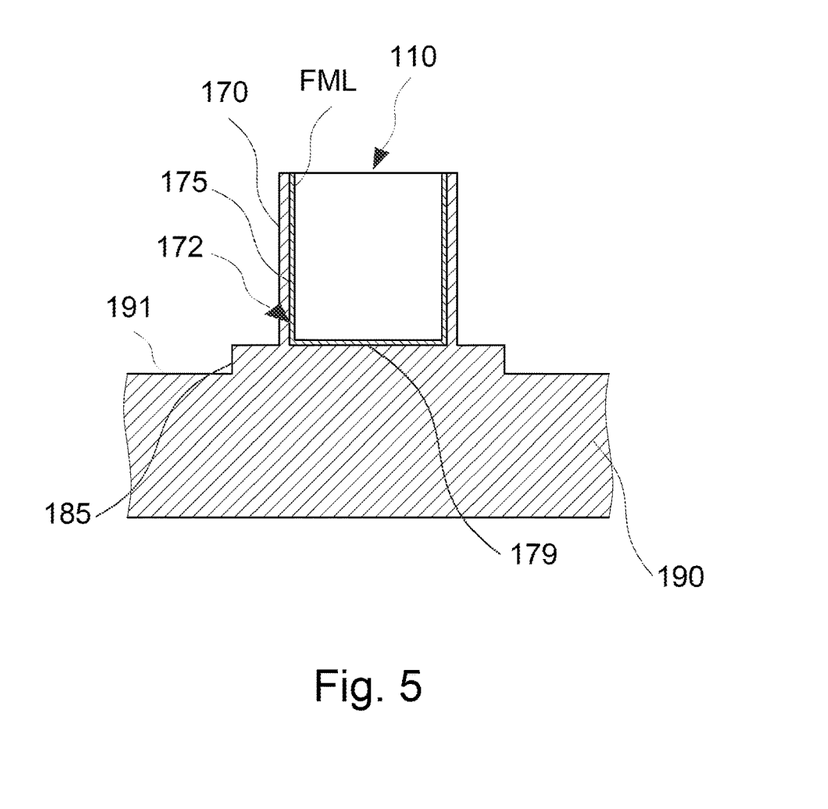
FIG. 5 is a schematic detailed cross-sectional view of the mufti-material boss having a filler material layer therein of FIG. 1A, following Step (1100) of the manufacturing method of FIG. 3, according to an exemplary embodiment.

FIG. 3 is a flow chart illustrating a manufacturing method of the multi-material boss of FIG. 1A, according to an exemplary embodiment. FIG. 4 is a schematic detailed cross-sectional view of the multi-material boss of FIG. 1A, following Step (1100) of the manufacturing method of FIG. 3, according to an exemplary embodiment. FIG. 5 is a schematic detailed cross-sectional view of the multi-material boss having a filler material layer therein of FIG. 1A, following Step (1100) of the manufacturing method of FIG. 3, according to an exemplary embodiment. Referring to FIGS. 3 to 5, and referring to FIGS. 1A to 2C, in an exemplary embodiment, a method of forming a multi-material boss 100, configured for fastening of a fastener thereto, being a feature of a die cast part 190, is provided. The method 1000 generally comprises the steps of providing a boss cylinder 170 and providing an augmenting cylinder 160, and bonding the augmenting cylinder 160 within the boss cylinder 170. Step (1100) comprises providing a boss cylinder 170, made of a same material as the die cast part 190 having a first liquidus temperature and a first hardness. Next, in Step (1200), determining whether the boss cylinder 170 comprises a first interior 172 defined by a first cylindrical shaped wall 175, a first base 179 and a receivable opening 110. If no, performing Step (1250). If yes, performing Step (1300). Step (1250) comprises drilling a first interior 172 of the boss cylinder 170 at a central axis thereof, defining a first cylindrical shaped wall 175, a first base 179, and a receivable opening 110.

Figure 6A:
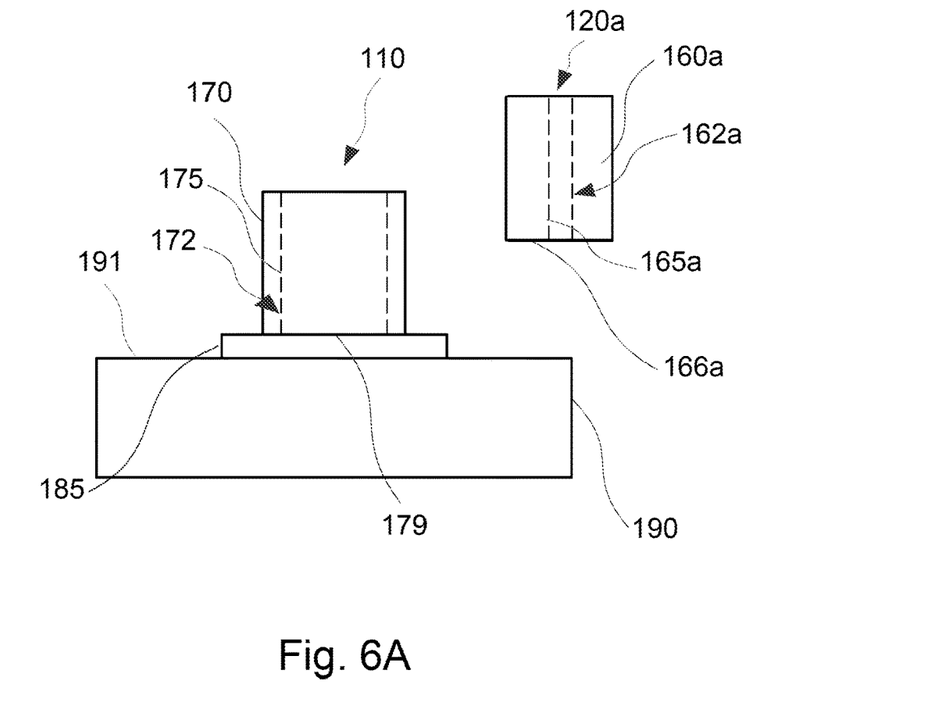
FIG. 6A is a schematic interior view of the multi-material boss of FIG. 1A, following Step (1300) of the manufacturing method of FIG. 3, according to an exemplary embodiment.
Figure 6B:
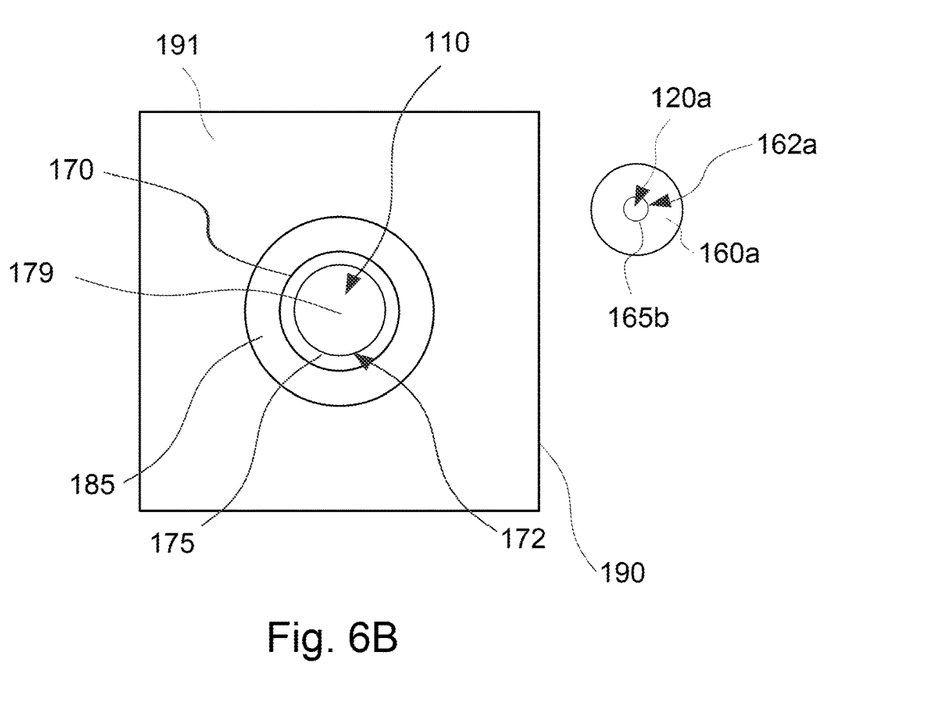
FIG. 6B is a schematic top view of the multi-material boss of FIG. 6A, following Step (1300) of the manufacturing method of FIG. 3, according to an exemplary embodiment.
Figure 6C:
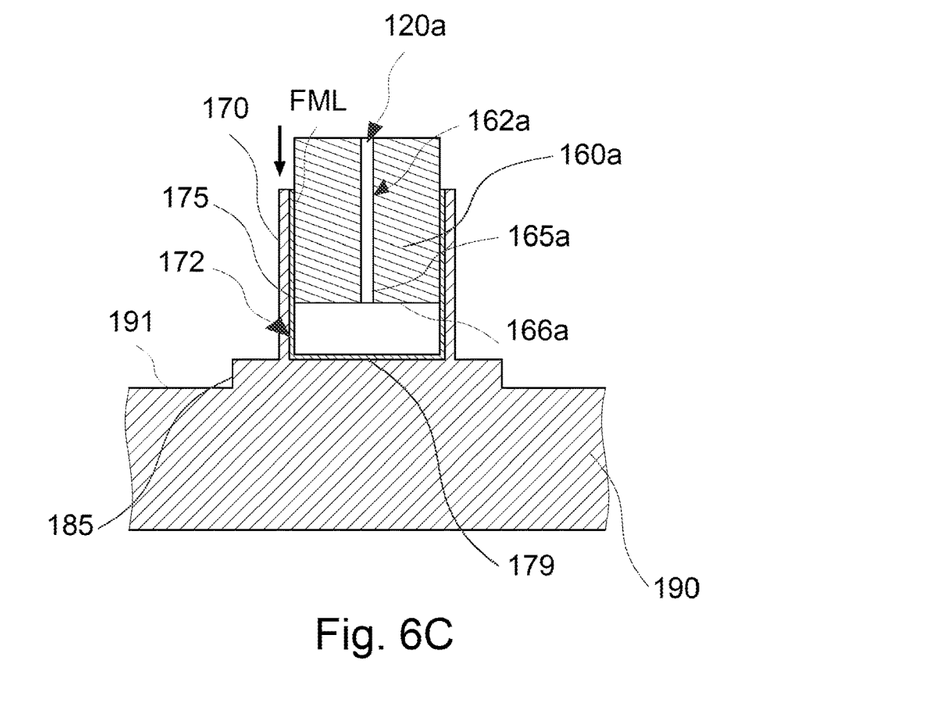
FIG. 6C is a schematic detailed cross-sectional view of the multi-material boss of FIG. 6A, during Step (1400) of the manufacturing method of FIG. 3, according to an exemplary embodiment.
Figure 6D:
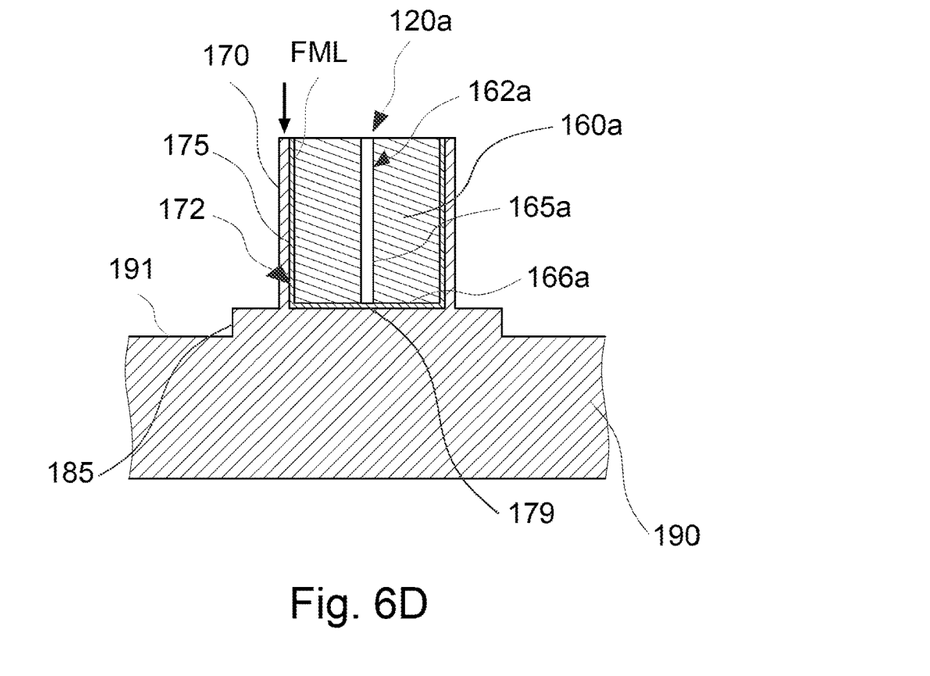
FIG. 6D is a schematic detailed cross-sectional view of the multi-material boss of FIG. 6A, following Step (1500) of the manufacturing method of FIG. 3, according to an exemplary embodiment.

FIG. 6A is a schematic interior view of the mug-material boss of FIG. 1A, following Step (1300) of the manufacturing method of FIG. 3, according to an exemplary embodiment and FIG. 6B is a schematic top view of the mufti-material boss of FIG. 6A, following Step (1300) of the manufacturing method of FIG. 3, according to an exemplary embodiment. FIG. 6C is a schematic detailed cross-sectional view of the multi-material boss of FIG. 6A, during Step (1400) of the manufacturing method of FIG. 3, according to an exemplary embodiment. FIG. 6D is a schematic detailed cross-sectional view of the multi-material boss of FIG. 6A, following Step (1500) of the manufacturing method of FIG. 3, according to an exemplary embodiment. Referring to FIGS. 6A and 6D, and referring to FIGS. 1A to 3, Step (1300) comprises providing an augmenting cylinder 160a, made of an augmenting material having a second liquidus temperature and a second hardness, wherein the second liquidus temperature is higher than the first liquidus temperature and the second hardness is greater than the first hardness, having a multi-functional through hole 162a defined by a working cylindrical shaped wall 165a, a working base rim 166a, and a multi-functional opening 120a. Following, in Step (1300), a filler metal FML, made of a material having a third liquidus temperature lower than that of the first and second liquidus temperatures, is provided in the first interior 172 of the boss cylinder 170 via the receivable opening 110. Step (1400) comprises press-inserting the augmenting cylinder 160a into the boss cylinder 170 via the receivable opening 110. In some embodiments, before the augmenting cylinder 160a is press-inserted into the boss cylinder 170 via the receivable opening 110 the mating surfaces thereof, respectively, are cleaned and free of grease, dirt or foreign matter by methods known to those having ordinary skill in the relevant art. Also, when mated, the augmenting cylinder 160a and boss cylinder 170 are not strained to ensure uniform pressure distribution across the entire bond areas for optimum bonding. Next, in Step (1500), the augmenting cylinder 160a is bonded to the boss cylinder 170 via brazing or soldering, at least spreading and adhering the filler metal between the working base rim 166a of the augmenting cylinder 160a and first base 179 of the first interior 172 of the boss cylinder 170 forming a filler metal layer (FML), whereby expanding air and gasses are vented through through hole 162a of the augmenting cylinder 160a.

Those having ordinary skill in the relevant art may readily appreciate that any suitably brazing or soldering filler metal known in the relevant art may be used to bond the augmenting cylinder 160a to the boss cylinder 170, such as copper, nickel, silver and aluminum/zinc alloys or lead/tin alloys, as examples. As long as the third liquidus temperature is lower than that of the first and second liquidus temperatures and suitable wetting, capillary action, spreading and adhesion is allowed to occur.

Figure 7A:
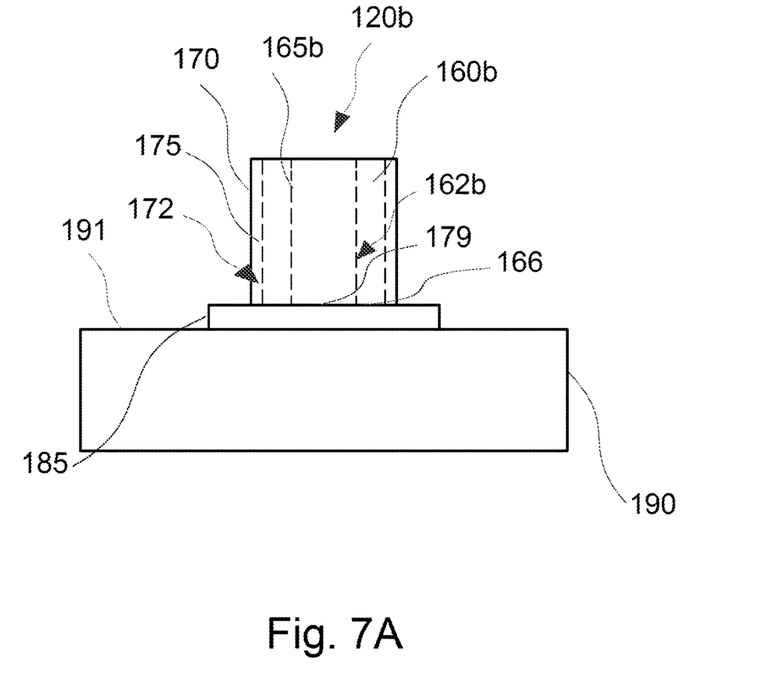
FIG. 7A is a schematic interior view of the multi-material boss of FIG. 1A, following Step (1600) of the manufacturing method of FIG. 3, according to an exemplary embodiment.
Figure 7B:
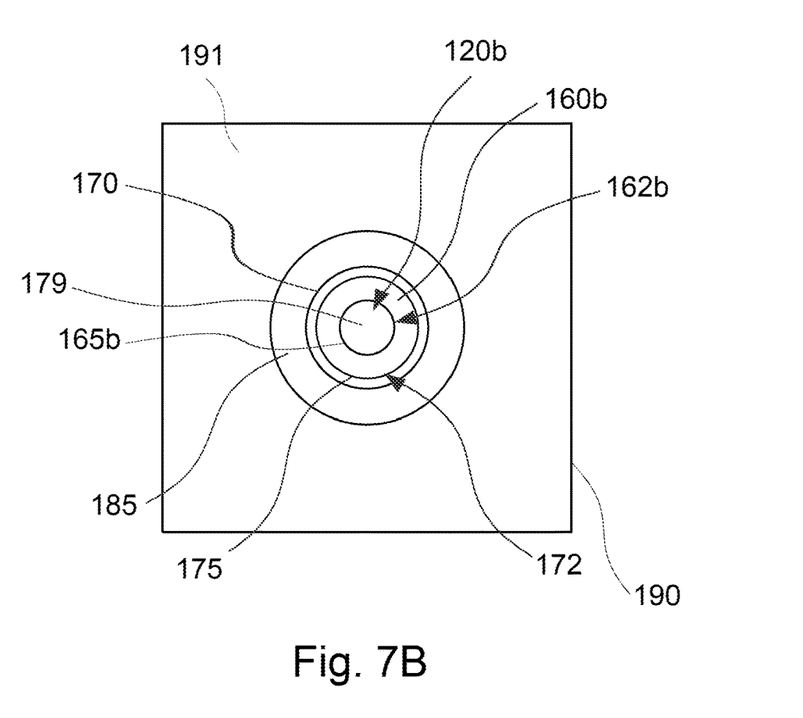
FIG. 7B is a schematic top view of the multi-material boss of FIG. 7A, following Step (1600) of the manufacturing method of FIG. 3, according to an exemplary embodiment.

FIG. 7A is a schematic interior view of the multi-material boss of FIG. 1A, following Step (1600) of the manufacturing method of FIG. 3, according to an exemplary embodiment and FIG. 7B is a schematic top view of the multi-material boss of FIG. 7A, following Step (1600) of the manufacturing method of FIG. 3, according to an exemplary embodiment. Referring to FIGS. 5A and 5B, and referring to FIGS. 1A to 4B, in Step (1600), cooling the augmenting cylinder 160a and boss cylinder 170 is performed. Next, in Step (1700), drilling the multi-functional through hole 162a of the augmenting cylinder 160a at the multi-functional opening 120a, forming an intermediary interior 162b, defining an intermediary cylindrical shaped wall 165b, an intermediary base rim 166, and an intermediary opening 120b is performed. Following, in Step (1800), tapping the intermediary interior 162b of the augmenting cylinder 160b at the intermediary opening 120b, forming a second interior 162, defining a second cylindrical shaped wall 165, a base rim 166, and a second opening 120 is performed.

Figure 8A:
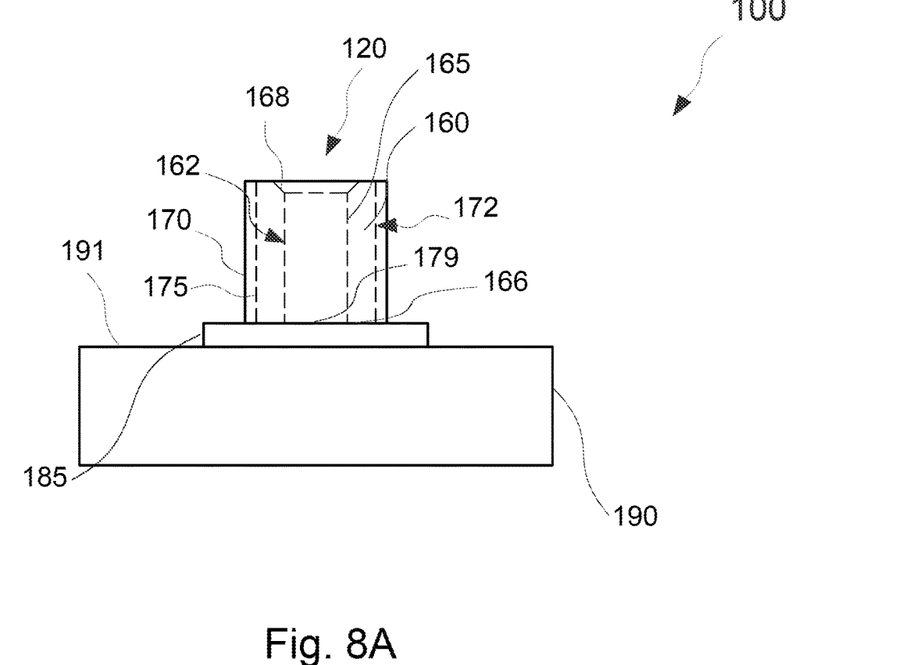
FIG. 8A is a schematic interior view of the multi-material boss of FIG. 1A, following Step (1900) of the manufacturing method of FIG. 3, according to an exemplary embodiment.
Figure 8B:
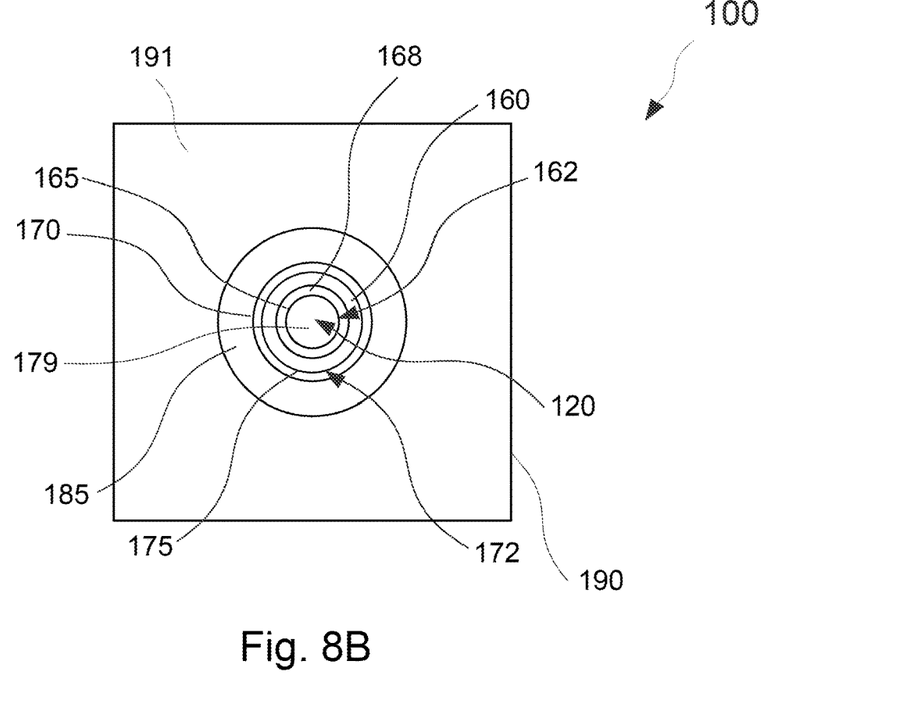
FIG. 8B is a schematic top view of the multi-material boss of FIG. 8A, following Step (1900) of the manufacturing method of FIG. 3, according to an exemplary embodiment.
Figure 8C:
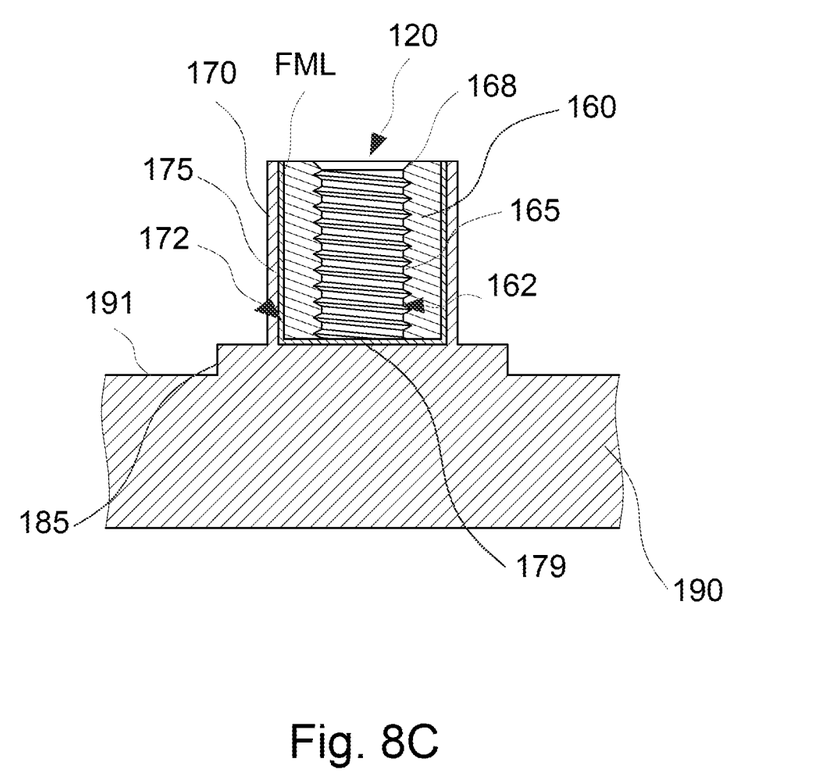
FIG. 8C is a schematic detailed cross-sectional view of the multi-material boss having a filler material layer therein of FIG. 8A, following Step (1900) of the manufacturing method of FIG. 3, according to an exemplary embodiment.

FIG. 8A is a schematic interior view of the multi-material boss of FIG. 1A, following Step (1900) of the manufacturing method of FIG. 3, according to an exemplary embodiment. FIG. 8B is a schematic top view of the mufti-material boss of FIG. 8A, following Step (1900) of the manufacturing method of FIG. 3, according to an exemplary embodiment. FIG. 8C is a schematic detailed cross-sectional view of the multi-material boss having a filler material layer (FML) therein of FIG. 8A, following Step (1900) of the manufacturing method of FIG. 3, according to an exemplary embodiment. Referring to FIGS. 8A to 8C, and referring to FIGS. 1A to 7B, Step (1900) comprises countersinking the second interior 162b of the augmenting cylinder 160b at the second opening 120b, enlarging a top portion of the second opening 120b forming a conical depression 168, configured for recessing a head of a fastener, whereby the fastener is fastened to the multi-material boss 100 via the second opening 120 of the augmenting cylinder 160 having the higher liquidus temperature and greater hardness.

Those having skilled in the relevant art may readily appreciate that additional 'Steps' may be added to the manufacturing method in order to incorporate additional features into the finished multi-material boss and the embodiments are not limited thereto. Also, the 'Steps' may be altered depending upon different requirements.

In some embodiments of the method, the feature of the die cast part 190 comprises a protruding feature extending from a surface 191 thereof. In some embodiments of the method, the die cast part 190 further comprises at least a strengthening member 185, configured for providing strength and stability to the protruding feature of the multi-material boss 100. In some embodiments of the method, the at least a strengthening member 185 comprises a spacer between the protruding feature of the multi-material boss 100 and surface 191 of the die cast part 190. In some embodiments of the method, the shape of the spacer comprises at least one of straight lines, curves, or any combination of the foregoing. In some embodiments of the method, the shape of the spacer is quadrilateral.

In some embodiments of the method, the feature of the die cast part comprises at least one of a protruding feature encompassing the multi-material boss 100, extending from an outer perimeter wall surface 191 of the die cast part, a protruding feature encompassing the multi-material boss 100, extending from an inner perimeter wall surface or corner to a base of the die cast part, or any combination of the foregoing.

In some embodiments of the method, the strengthening member 185, comprises a spacer 185 between the protruding feature of the multi-material boss 100 and surface 191 of the die cast part 190; however, the embodiments are not limited thereto. Those having ordinary skill in the relevant art may readily appreciate that the feature of the die cast part 190 may also comprise at least one of a gusset extending from an outer sidewall of the multi-material boss to a base of the die cast part, a rib extending from an outer sidewall of the multi-material boss to a wall of the die cast part, or any combination of the foregoing.

In some embodiments of the method, the die cast part 190 is made of an aluminum alloy material and the augmenting cylinder 160 is made of at least one of a stainless steel, iron, aluminum silicon alloy, copper, copper alloy, aluminum magnesium alloy material, having a second hardness greater than the first hardness of the boss cylinder 170.

In some embodiments of the method, the die cast part 190 is made of an aluminum alloy material; however, the embodiments are not limited thereto. Those having ordinary skill in the relevant art may readily appreciate that the die cast part 190 may also be made of alternative materials suitably known in the art. As an example, in some embodiments of the method, the die cast part 190 is made of at least one of a zinc alloy, magnesium, zinc-aluminum alloy, copper, tin or lead material, or any combination of the foregoing.

In some embodiments of the method, the augmenting cylinder 160 is made of at least one of a stainless steel, iron, aluminum silicon alloy, copper, copper alloy, and aluminum magnesium alloy material; however, the embodiments are not limited thereto. Those having ordinary skill in the relevant art may readily appreciate that the augmenting cylinder 160 may be made of at least one of a stainless steel, iron, aluminum silicon alloy, copper, copper alloy, aluminum magnesium alloy material. As long as the second liquidus temperature and second hardness of the augmenting cylinder 160 is higher and greater than the first liquidus temperature and first hardness of the boss cylinder 170, respectively.

In some embodiments of the method, the number of the multi-material bosses 100 is two or greater.

Bosses generally aid in the assembly of enclosures, acting as mounting points of the enclosures or other components. Screw bosses provide a channel for a screw for assembly. Despite screws being a reliable and inexpensive method of mechanical fastening, mounting point fastening failure often occurs due to wear-and-tear caused by multiple assembly, disassembly, and reassembly procedures. Generally, chipping or cracking caused by tensile stresses that can be induced under high pressure or cross threading, and the like, may result, in fastening failure and/or decreased fastening effectiveness.

One technique developed for decreasing and/or mitigating fastening failure and decreased fastening effectiveness is to replace bosses with a more durable and harder material threaded insert or bushing. However, costs would be increased due to the pre-threaded part and additional costs for adhesives required for securing the threaded insert or bushing in place so it doesn't back out would also need to be incurred.

In the exemplary embodiments, a multi-material boss 100, configured for fastening of a fastener (not shown) thereto, being a feature of a die cast part 190, comprising a boss cylinder 170, an augmenting cylinder 160, and a filler metal layer FML is provided. The boss cylinder 170 is made of a same material as the die cast part 190 having a first liquidus temperature and a first hardness, and has a first interior 172 defined by a first cylindrical shaped wall 175, and a first base 179. The augmenting cylinder 160 is made of an augmenting material having a second liquidus temperature and a second hardness, is fixedly secured in the boss cylinder 170, and has a second interior 162 defined by a second cylindrical shaped wall 165, a base rim 166, and a second opening 120. The second liquidus temperature is higher than the first liquidus temperature and the second hardness is greater than the first hardness. The fastener is fastened to the multi-material boss 100 via the second opening 120 of the augmenting cylinder 160 having the higher liquidus temperature and greater hardness.

Thus, costs are not increased due to requirement of pre-threaded parts and additional costs for adhesives required for securing threaded inserts or bushings in place so it doesn't back out are also not incurred, whereby costs for pre-threaded parts are higher than costs for non-threaded parts. Furthermore, due to the multi-functional through hole 162a, the press-insertion Step (1400) is facilitated, as air is conveniently exhausted through the multi-functional through hole 162a and does not get entrapped between the bottoms of the augmenting cylinder 160a and boss cylinder 170. Additionally, due to the multi-functional through hole 162a, expanding air and gasses due to the brazing or soldering process is conveniently vented, mitigating ejection of the augmenting cylinder 160a and allowing the filler metal to evenly wet, spread and adhere to the surfaces of the augmenting cylinder 160a and the boss cylinder 170, facilitating capillary action for solid bonding. Also, due to the multi-functional through hole 162a already being provided in the augmenting cylinder 160a, additional processes for drilling venting holes are eliminated. Additionally, due to the multi-functional through hole 162a, concern is not required for sharp corners or blind holes causing flux entrapment, as proper venting is conveniently provided.

The presently disclosed inventive concepts are not intended to be limited to the embodiments shown herein, but are to be accorded their full scope consistent with the principles underlying the disclosed concepts herein. Directions and references to an element, such as "up," "down," "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112f unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A method of forming a multi-material boss, configured for fastening of a fastener thereto, being a feature of a die cast part, comprising the steps of:
   providing a boss cylinder having a first hardness;
   determining whether the boss cylinder comprises a first interior defined by a first cylindrical shaped wall, a first base and a receivable opening, if no, performing Step (a) before performing Step (b), if yes, proceeding to Step (b);
   (a): drilling the first interior of the boss cylinder at a central axis thereof, defining the first cylindrical shaped wall, the first base, and the receivable opening;
   (b): providing an augmenting cylinder, made of an augmenting material having a second hardness, wherein the second hardness is greater than the first hardness, having an interior defined by a cylindrical shaped wall, a base rim, and an opening;
   providing a filler metal, in the first interior of the boss cylinder via the receivable opening;
   press-inserting the augmenting cylinder into the boss cylinder via the receivable opening;
   bonding the augmenting cylinder to the boss cylinder via brazing, thereby spreading and adhering the filler metal between the base rim of the augmenting cylinder and the first base of the first interior of the boss cylinder forming a filler metal layer, whereby expanding air and gasses are vented through the interior of the augmenting cylinder;
   cooling the augmenting cylinder and boss cylinder;
   drilling the interior of the augmenting cylinder at the opening, forming an intermediary interior, defining an intermediary cylindrical shaped wall, a base rim, and an intermediary opening;
   tapping the intermediary interior of the augmenting cylinder at the intermediary opening, forming a second interior, defining a second cylindrical shaped wall, a base rim, and a second opening; and
   countersinking the second interior of the augmenting cylinder at the second opening, thereby enlarging a top portion of the second opening forming a conical depression, configured for recessing a head of a fastener,
   whereby the fastener is fastened to the multi-material boss via the second opening of the augmenting cylinder having the second hardness.

2. The method of claim 1, wherein the boss cylinder comprises a material having a first liquidus temperature, the augmenting material has a second liquidus temperature higher than the first liquidus temperature, and the filler metal comprises a filler material having a third liquidus temperature lower than the first and second liquidus temperatures.

3. The method of claim 1, wherein the boss cylinder is made of the same material as the die cast part.

4. The method of claim 1, wherein the die cast part is made of at least one of an aluminum alloy, zinc alloy, magnesium, zinc-aluminum alloy, copper, tin or lead material, or any combination of the foregoing.

5. The method of claim 1, wherein the augmenting cylinder is made of at least one of a stainless steel, iron, aluminum silicon alloy, copper, copper alloy, and aluminum magnesium alloy material.

6. The method of claim 1, wherein the boss cylinder extends in a direction away from a surface of the die cast part, and the die cast part further comprises a strengthening member, configured for providing strength and stability to the multi-material boss.

7. The method of claim 6, wherein the strengthening member comprises a spacer disposed between the multi-material boss and the surface of the die cast part.

8. The method of claim 7, further comprising forming the spacer in the shape of at least one of straight lines, curves, or any combination of the foregoing.

* * * * *